3,031,384
SEPARATION OF ACETONE, ALCOHOL
AND WATER
Lionel J. Sirois, Edison Township, Middlesex County,
Julian F. Mote, Roselle, and Austin G. Habib, Elizabeth, N.J., assignors to Esso Research and Engineering
Company, a corporation of Delaware
Filed Sept. 15, 1959, Ser. No. 840,047
11 Claims. (Cl. 202—42)

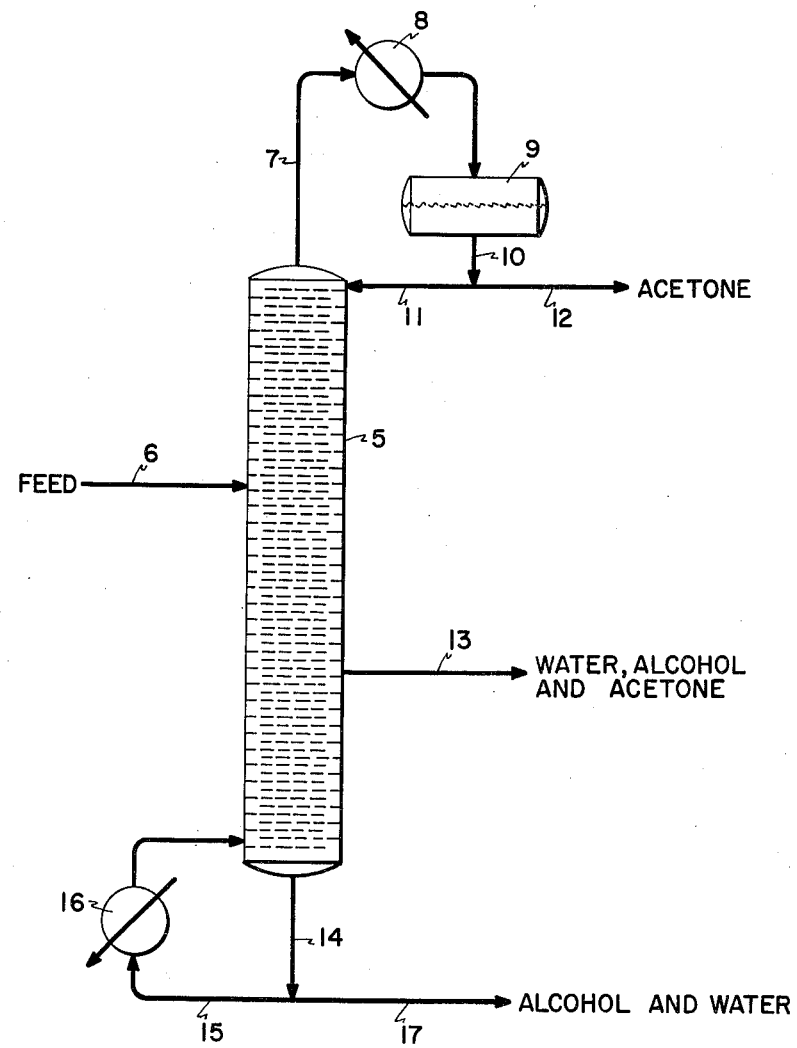

The present invention relates to a novel process for concentrating components in a liquid mixture. More particularly it pertains to a method for separating acetone, isopropyl alcohol and water from a mixture of the same in a single distillation tower. In one aspect it concerns the recovery of high purity acetone and isopropyl alcohol from said mixture; in another aspect of the invention part of the water is removed from the mixture and concentrated, e.g. 90+ mole percent, acetone and isopropyl alcohol are recovered.

In separating multicomponent mixtures which contain substances that form binary azeotropes under distillation conditions it is usually necessary to transfer these substnaces to another distillation tower to recover either one of the components in a pure state in addition to the azeotrope. When mixtures of acetone, isopropyl alcohol and water are distilled in conventional processes, pure acetone is taken overhead and the higher boiling isopropyl alcohol-water mixture is withdrawn from the bottom. This mixture is then transferred to a second tower in which it is distilled under conditions which permit the recovery of pure alcohol or water in the bottoms stream and an azeotrope overhead.

It has now been discovered that acetone and isopropyl alcohol or water can be concentrated in a single distillation tower from a feed containing all three components, and, if desired, pure alcohol or water (depending on feed composition) and acetone can be recovered as bottoms and top streams, respectively, from the tower under conditions to be set forth hereinafter. The separation is accomplished by withdrawing an alcohol-water mixture which approximates the azeotrope as a side stream from the tower at a point below the place where the feed is introduced into the tower. If the concentration of alcohol, with respect to water, in the feed is above that of the normal alcohol-water azeotrope mixture, the side stream will be located at or near the point of maximum water concentration; on the other hand, if the concentration of alcohol, with respect to water, in the feed is below that of the normal alcohol-water azeotrope, the side stream will be located at or near the point of maximum alcohol concentration. The presence of acetone in the tower below the feed point prevents the formation of the isopropyl alcohol-water azeotrope and this is the reason why the process is operative.

By using conventional calculating systems, such as those described on page 219 and elsewhere in "Elements of Fractional Distillation," by Robinson and Gilliland, fourth edition, 1950 (McGraw-Hill Book Co.), one can locate the side stream withdrawal point from available ternary vapor-liquid equilibrium data. The location, as discussed above, is mainly dependent on the composition of the feed and the purity of the overhead and bottoms product. It has been found that the concentration of acetone at the aforementioned location should be at least about 0.1 mole percent and may be as high as 5 mole percent, although where the overhead and bottoms products are substantially pure and the side stream approximates the azeotrope, the concentration of acetone will usually be about 1 to 3 mole percent.

The acompanying drawing diagrammatically illustrates one embodiment of the present invention.

In carrying out the invention, a ternary feed within the following composition range is introduced into a tower having a plurality of conventional contacting plates, e.g. bubble cap trays or jet trays:

*Feed Composition*

| | Mole percent |
|---|---|
| Acetone | 20–90 |
| Water | 1–40 |
| Isopropyl alcohol | 10–80 |

While the number of plates in the tower can vary depending on the product purity desired, for most purposes, there should be at least 40 plates in the tower, of which about one-half to three-quarters are in the stripping zone which is the area between the feed point and the bottom of the tower. For economical reasons, the number of plates should not exceed 100 and preferably the upper limit is about 75. For example, if the overhead product is to have a purity of 99 mole percent or higher and the feed contains mostly acetone the tower should contain about 60 to 75 plates and the stripping zone should have about 30 to 45 plates. Under the aforementioned conditions, the side stream which contains the water-alcohol mixture is withdrawn from about the 20th to 30th plate in the tower. In other words, the side stream should communicate with a tray which is about 10 to 20 trays below the feed point.

The tower is preferably operated under conditions which permit the removal of a side stream containing either a maximum of water or alcohol, depending on feed composition, from the stripping zone and a substantially pure bottoms product. The temperatures in the tower are generally above room temperature and advantageously range from about 40° to 150° C. depending upon the pressure employed. While the preferred pressure is atmospheric, reduced and superatmospheric pressures, e.g. 0.5 to 3 atmospheres pressure, may be used. When operating at atmospheric pressure, the temperatures in the tower are usually between about 55° at the top of the tower and 110° C. at its bottom. The temperatures and pressures are not critical and it should be borne in mind that the values given above are the recommended conditions. Other temperatures and pressures can be employed.

The feed point is generally located about the middle third of the tower and always above the side stream. The acetone product stream, which comprises a major proportion of acetone, is above the feed point and at or near the top of the tower. The acetone product stream may contain from 90 to 100 mole percent acetone, the balance being principally water. When operating the tower to obtain acetone having a purity of at least 99.5 mole percent, the usual composition of the side stream is as follows:

*Composition of Side Stream*

| | Mole percent |
|---|---|
| Acetone | 0.5–5 |
| Water | 20–30 |
| Isopropyl alcohol | 65–80 |

The bottoms stream, which is the balance of the feed, is essentially free of acetone and can comprise up to 100 mole percent of alcohol or water, i.e. water, alcohol and mixtures thereof, depending on the feed composition and other conditions. For example, if the feed contains more than 2.3 times as many moles of alcohol as water, the bottoms stream will contain mostly alcohol.

The isopropyl alcohol recovered from the process may be used as a diluent or it can be dehydrogenated to convert it to acetone which, together with the acetone recovered overhead in the above-described process, is used as an industrial solvent for chemicals.

A preferred embodiment of the invention will now be described with reference to the accompanying drawing. A feed comprising a major proportion of acetone and minor proportions of water and isopropyl alcohol (71 mole percent acetone, 8 mole percent water and 21 mole percent isopropyl alcohol) is introduced at approximately the 43rd bubble cap plate in tower 5, which contains seventy such plates, through line 6 at the rate of 17,900 lbs. per hour. The overhead product of the tower, which is operated under approximately atmospheric pressure, is withdrawn through line 7 at a temperature of 56° C. and passed through a cold water, i.e. 25° C., condenser 8 prior to being introduced into drum 9 in which the temperature of the liquid is about 45° C. The liquid in drum 9 is withdrawn through line 10 and a portion is recycled to the rectifying zone of tower 5 via line 11 as reflux at a reflux ratio of approximately 5:1. The other part of the liquid in line 10, which comprises 99.5 mole percent acetone and 0.5 mole percent water, is continuously withdrawn through line 12 at the rate of 13,900 lbs. per hour. A side stream comprising 71.5 mole percent alcohol, 27 mole percent water and 1.5 mole percent acetone is continuously withdrawn from tower 5 through line 13 which communicates with the 25th plate in said tower. The liquid in the side stream, which is approximately the same as the azeotropic mixture of isopropyl alcohol and water, is withdrawn at the rate of 590 lbs. per hour. The bottoms stream is withdrawn from tower 5 through line 14 at a temperature of 85° C. and 73,000 lbs. per hour is recycled to the bottom of tower 5 through line 15 which passes through a steam (110 p.s.i.g.) reboiler 16. The other portion of the bottoms in line 14, which comprises 90.5 mole percent isopropyl alcohol and 9.5 mole percent water, is withdrawn through line 17 at the rate of 3,410 lbs. per hour.

It is not intended to restrict the present invention to the foregoing embodiment, but rather it should only be limited by the appended claims in which it is intended to claim all the novelty inherent in the invention. For instance, the reflux ratio may be almost any ratio, although it is generally between 1.5 and 10.

What is claimed is:

1. Process for concentrating components in a liquid mixture which comprises introducing a feed containing acetone, isopropyl alcohol and water into a distillation zone, withdrawing vaporized liquid comprising at least a major proportion of acetone from said zone at a point above the place where the feed is introduced, withdrawing a liquid bottoms stream from said zone and withdrawing a side stream containing mainly alcohol and water in admixture with a small amount of acetone from said zone at a point below the place where the feed is introduced and above the bottoms stream, said bottoms stream comprising the balance of the feed.

2. Process for concentrating components in a liquid mixture which comprises introducing a liquid feed containing substantially acetone, isopropyl alcohol and water into a distillation zone which is above room temperature, withdrawing vaporized liquid comprising at least about 90 mole percent of acetone from said zone at a point above the place where the feed is introduced, withdrawing a liquid bottoms stream from said zone which is essentially free of acetone, and withdrawing a side stream comprising a minor proportion of acetone and a major proportion of approximately the azeotropic mixture of said alcohol and water from said zone at a point below the place where the feed is introduced and above the bottoms stream, said bottoms stream comprising the balance of the feed.

3. Process for concentrating components in a liquid mixture which comprises introducing a liquid feed containing substantially acetone, isopropyl alcohol and water into a distillation zone at a point which is located at about the middle third of said zone, said zone being at about 40–150° C. and under a pressure of 0.5 to 3 atmospheres, withdrawing vaporized liquid comprising at least 90 mole percent acetone from the top of said zone, withdrawing a liquid bottoms stream comprising a liquid consisting of water, isopropyl alcohol and mixtures thereof from said zone which is essentially free of acetone, and withdrawing a side stream containing about 0.5 to 5 mole percent acetone from said zone at a point below the place where the feed is introduced and above the bottoms stream, the balance of said side stream being approximately the azeotropic mixture of said alcohol and water.

4. Process according to claim 3 in which the distillation zone is at 55–110° C. and about 1 atmosphere pressure.

5. Process according to claim 3 in which the bottoms stream comprises at least 90 mole percent alcohol.

6. Process according to claim 3 in which the bottoms stream comprises at least 90 mole percent water.

7. Process according to claim 3 in which the vaporized liquid comprises at least 99 mole percent acetone.

8. Process for concentrating components in a liquid mixture which comprises introducing a liquid feed comprising 20–90 mole percent acetone, 1–40 mole percent water and 10–80 mole percent isopropyl alcohol into a distillation zone at a point which is located at about the middle third of said zone, said zone being at about 40–150° C. and under a pressure of 0.5 to 3 atmospheres, withdrawing vaporized liquid comprising at least 90 mole percent acetone from the top of said zone, withdrawing a liquid bottoms stream from said zone which is essentially free of acetone, and withdrawing a side stream comprising about 0.5–5 mole percent acetone, 20–30 mole percent water and 65–80 mole percent isopropyl alcohol from said zone at a point below the place where the feed is introduced and above the bottoms stream, said bottoms stream comprising a liquid consisting of water, isopropyl alcohol and mixtures thereof.

9. Process according to claim 8 in which the feed contains more acetone than isopropyl alcohol and more of said alcohol than water.

10. Process according to claim 8 in which the feed contains a major proportion of acetone and minor proportions of isopropyl alcohol and water, said alcohol being present in an amount which is at least 2.3 times the amount of water on a molar basis.

11. Process according to claim 8 in which the bottoms stream comprises at least 90 mole percent isopropyl alcohol.

References Cited in the file of this patent

UNITED STATES PATENTS

| | | |
|---|---|---|
| 2,454,734 | Darlington et al. | Nov. 23, 1948 |
| 2,481,211 | Fuqua | Sept. 6, 1949 |
| 2,510,806 | Egberts et al. | June 6, 1950 |
| 2,640,017 | Graff | May 26, 1953 |
| 2,669,541 | Catterall | Feb. 16, 1954 |
| 2,806,816 | Staib et al. | Sept. 17, 1957 |